(12) United States Patent  (10) Patent No.: US 8,333,283 B2
Zhang  (45) Date of Patent: Dec. 18, 2012

(54) CYCLONE SEPARATOR

(75) Inventor: Ling Zhang, Dongcheng District (CN)

(73) Assignee: Sino-Gas & Oil Technology, Co., Ltd., Beijing (CN)

( * ) Notice: Subject to any disclaimer, the term of this patent is extended or adjusted under 35 U.S.C. 154(b) by 64 days.

(21) Appl. No.: 12/999,883

(22) PCT Filed: Jan. 9, 2009

(86) PCT No.: PCT/CN2009/000035
§ 371 (c)(1),
(2), (4) Date: Feb. 18, 2011

(87) PCT Pub. No.: WO2009/152678
PCT Pub. Date: Dec. 23, 2009

(65) Prior Publication Data
US 2011/0139710 A1  Jun. 16, 2011

(30) Foreign Application Priority Data
Jun. 19, 2008 (CN) .......................... 2008 1 0115237

(51) Int. Cl.
B01D 17/038 (2006.01)
(52) U.S. Cl. ................... 210/512.2; 210/512.3; 209/728
(58) Field of Classification Search ............... 210/512.2, 210/512.3; 209/711, 714, 728; 55/459.1
See application file for complete search history.

(56) References Cited

U.S. PATENT DOCUMENTS
4,995,989 A * 2/1991 Carroll et al. ............. 210/512.2
7,306,639 B2 12/2007 Wydra et al.

FOREIGN PATENT DOCUMENTS

| CN | 2279959Y | Y | 4/1998 |
|---|---|---|---|
| CN | 1191159A | A | 8/1998 |
| CN | 2308442Y | Y | 2/1999 |
| CN | 2501584Y | Y | 7/2002 |
| CN | 2516258Y | Y | 10/2002 |
| CN | 2551314Y | Y | 5/2003 |
| CN | 1986073A | A | 6/2007 |
| CN | 200949459Y | Y | 9/2007 |
| CN | 201200824Y | Y | 4/2009 |
| CN | 1016078147A | A | 12/2009 |

OTHER PUBLICATIONS

Huang, Si, "Numerical Simulation of Oil-Water Hydrocyclone Using Reynolds-Stress Model for Eulerian Multiphase Flows," The Canadian Journal of Chemical Engineering, Oct. 2005, vol. 83, pp. 829-834.
International Search Report for PCT/CN2009/000035, dated Apr. 16, 2009, 6 pages.

* cited by examiner

Primary Examiner — David A Reifsnyder
(74) Attorney, Agent, or Firm — Chainey P. Singleton; Edwin S. Flores; Chalker Flores, LLP

(57) ABSTRACT

The present invention discloses a cyclone separator (1) which comprises an inlet section (2), a first cone (3) and a steady flow section (7) that are connected in succession, wherein the inlet section (2) is provided with at least one tangent inlet (11) with which a inflow pipe (8) is connected; the first cone (3) is tapered downwards; the steady flow section (7) is an elongated cylindrical pipe with an outlet (12) at its tail; characterized in that it further comprises a second cone or tapered body (4) positioned above the inlet section (2) and connected with the same, wherein the second cone or tapered body (4) is tapered upwards and has a top opening (14).

19 Claims, 5 Drawing Sheets

CYCLONE SEPARATOR

FIELD OF THE INVENTION

The present invention relates to a cyclone separator, in particular a cyclone separator used for liquid-liquid separation, solid-liquid separation and gas-solid separation.

BACKGROUND OF THE INVENTION

The cyclone separator acts as a common classifier or separation equipment, and its working principle is centrifugal settling. A strong rotating shear turbulent motion is generated after the two-phase or three-phase mixture under certain pressure has entered into the cyclone separator from the circumference thereof in the tangential direction. Coarse particles or heavy phase and fine particles or light phase are subjected to different centrifugal force, centripetal buoyancy and drag force etc. due to the granularity or density difference therebetween. Under the action of centrifugal settling, most of the coarse particles or heavy phase is discharged through the bottom opening of the cyclone separator, while most of fine particles or light phase is discharged through over-flow pipe, so as to achieve the object of classifying and separation.

The application of the cyclone separator in the treatment of wastewater containing oil falls within liquid-liquid centrifuging separation technique, which has such advantages as small bulk, lightweight and reduced space requirement and so on. This technique originated from Southampton University, UK in 1970's, when M. T. Thew for the first time used the cyclone separator in oil-water separation. In 1980's, cyclone technique is applied to liquid-liquid separation in petroleum industry, and then in the following twenty years the liquid-liquid hydro-cyclone separator has been improved continually.

The liquid-liquid hydro-cyclone separator separates different substances via the centrifugal force generated by the rotation of fluid. The Chinese Patent CN02239957.7 (Publication Date: May 21, 2003) discloses an oil-water cyclone separator which is suitable to be used for the treatment of wastewater in the process of treating the produced fluid in oil field. The oil-water cyclone separator mainly comprises four revolutions, i.e. inlet section, accelerating section, separating section and steady flow section, wherein the oil outflow pipe is located in the center at the end of the inlet section which is further provided with two tangent inlets. High speed rotation of liquid mixture is generated after the liquid mixture flows from the inlets in tangent direction into the inlet section. Due to different densities of light and heavy components in the mixture, the heavy components, under the action of the centrifugal force, will move toward and concentrate at the wall surface of the hydro-cyclone separator, and then gradually move toward the bottom outlet during rotating, and is finally discharged from the cyclone separator. At the same time, the light components will move toward the central axis of the separator and form an oil core, then flow toward inlet section and flow out through the overflow opening. In this way, the separation of the light and heavy components is achieved.

The previous Chinese Patent CN00217613.0 (Publication Date: Mar. 14, 2001) also disclosed an oil-water cyclone separator. The general structure thereof is similar to the above patent except the accelerating section and the separating section, which have a plurality of taper angles and result in a better separation effect.

The oil-water cyclone separators are generally divided into two types, i.e. de-oiling type and de-watering type. In general, the de-oiling type oil-water cyclone separator is used for treatment of wastewater containing oil (e.g. the oil-water mixture in which the oil-content is less than 2%) to remove the oil thereof. In case the above mentioned oil-water cyclone separator is used to treat wastewater with lower oil content, the oil discharged from the outflow would have a higher water content, and especially the separator will have poor effect when used for separating wastewater with higher oil content or having higher viscosity. In addition, due to different or fluctuating pressures of wastewater containing oil at the inlet section, it is difficult to have a steady oil core flowing in the opposite direction, and thus the separated oil cannot flow out of the small overflow opening smoothly, which might also result in the undesired re-mixing of the separated oil and water.

When applied to solid-liquid separation, gas-solid separation and gas-liquid separation, the cyclone centrifugal separator also has similar problem, i.e. the outlet of light phase and the inlet of the cyclone centrifugal separator are easily communicated to each other, which results in a poor separation effect.

SUMMARY OF THE INVENTION

In light of the problems discussed above, the object of the present invention is to provide an improved cyclone separator with characteristics of wide application scope, good stability, high separation efficiency and low energy consumption.

Accordingly, the present invention provides a cyclone separator which comprises an inlet section, a first cone and a steady flow section that are connected in succession, wherein the inlet section is provided with at least one tangent inlet with which an inflow pipe is connected; the first cone is tapered downwards; and the steady flow section is configured as an elongated cylindrical pipe with an outlet at its tail; the said cyclone separator is characterized in that it further comprises a second cone or tapered body positioned above and connected with the inlet section, wherein the second cone or tapered body is tapered upwards and has a top opening.

As the second cone or tapered body of large size instead of an overflow opening of small size is provided adjacent the inlet section, so that a light phase flowing in opposite direction, such as oil, can be easily captured therein and tapered along the inner surface of the second cone or tapered body, thereby the light phase has a maximized flow speed at the top opening. In this way, the light phase may be drawn out with little heavy phase such as water.

According to a further aspect of the present invention, a shaft is installed along the centre axis of the cyclone separator, and the shaft extends at least from the top opening to the vicinity of the middle of the inlet section.

Furthermore, the shaft is in the form of a cylinder which is hollow at least from the vicinity of the middle of the inlet section to the top opening. The cylinder is closed at the vicinity of the middle of the inlet section and opened at the top, and a hole/holes communicated with the top is/are provided on a hollowed side wall of the cylinder adjacent the closed position.

The shaft is rotational and provided with an assistant blade or blades slightly above the middle of the inlet section. In an aspect, the assistant blade is configured as a small impeller driven by a motor. In addition, the shaft has a rotating speed in the range of 20~3000 RPM, depending on the shearing properties of the medium to be separated. Preferably, the shaft is rotated in a direction in consistent with the direction of swirling flow. To this end, a motor with adjustable rotating speeds or a transmission with adjustable output speed can be adopted.

In order to prevent the fluid from being disturbed excessively, the assistant blade is configured with relatively small radius. Herein, the rotating speed of the assistant blade can be determined depending on the properties of the medium to be separated, e.g. the assistant blade may have a lower rotating speed when the medium to be separated has a higher viscosity, while it may have a higher rotating speed when the medium to be separated has a lower viscosity. In the present invention, the assistant blade is mainly used for separating wastewater containing oil with higher viscosity and wastewater having higher oil content. Under a certain rotating speed, the oil with higher viscosity presents a shear thinning property of non-Newtonian fluid, and thus the viscosity of the oil is reduced by mixing and accelerating of the assistant blade, therefore the flow characteristic of the oil is improved, which results in easily and quickly moving up for the separated oil along the conical surface.

In a further aspect of the present invention, the cylinder is configured to rotate around the central axis of the separator and be provided with adjacent to the inlet of steady flow section a spiral channel, which extends downwards on its outer wall. This spiral channel provided aims to reduce a re-flow disturbance in heavy phase at the inlet of the steady flow section, so as to facilitate separation. Said heavy phase will rotate along the wall. Herein, the elongated cylinder may be driven by a motor, with a rotating speed in the range of 20~3000 RPM and a rotating direction preferably in consistent with the direction of swirling flow.

In this case, the rotating cylinder has a function of flow guiding. Some of upward light phase medium flows into the hollow section of the cylinder through a hole or holes on the wall and along an inner wall thereof, then flows upwards out of the cylinder. In this way the separation of the light phase medium is further facilitated. As required, an assistant blade or blades is/are optionally mounted on the cylinder slightly above the middle of the inlet section.

Advantageously, in the cyclone separator according to the present invention, the first cone includes an accelerating section and a separating section which have different taper angles, and preferably the taper angle of the accelerating section is greater than that of the separating section. Such configuration provides the separator with better separation effect.

Additionally, the first cone and the second cone have different taper angles in the vicinity of the inlet section, wherein a first taper angle is between 10 degree and 30 degree. In the above mentioned cyclone separator, there are two tangent inlets which are configured at the inlet section in such a way that the fluid enters in the inlet section can rotate by itself, preferably counter-clockwise. In an embodiment, the two tangent inlets are located at the same height and spaced apart at 180 degree. It is understood that more or less tangent inlets are also possible.

According to another aspect of the invention, downstream the top opening, a valve is provided for switching the top opening. The valve can be switched on at regular interval, in order to draw out the separated light phase medium more effectively. In addition, the top opening is connected with a discharging pipe, so as to discharge the separated light phase medium.

It is apparent that the present invention has advantages of wide application scope, i.e., the cyclone separator can be used for liquid-liquid separation, solid-liquid separation and gas-solid separation, high efficiency, simple construction, lower energy consumption and compact type. In the present invention, the cyclone separators can be used not only separately, but also in parallel or in series. Furthermore, the cyclone separators may be flexibly combined with the existing apparatus.

BRIEF DESCRIPTION OF THE DRAWINGS

Preferred embodiments of the present invention will now be described herein below by way of example and with reference to the accompanying drawings, in which.

LIST OF REFERENCE NUMERALS

1—Cyclone separator; 2—inlet section; 3—first cone; 4—second cone or tapered body; 5—accelerating section; 6—separating section; 7—steady flow section; 8—inflow pipe; 9—shaft; 10a—cylinder; 10—assistant blade; 11—tangent inlet; 12—outlet; 13—pipe opening; 14—top opening; 15—discharging pipe.

DETAILED DESCRIPTION OF DEPICTED EMBODIMENTS

Figure 1:
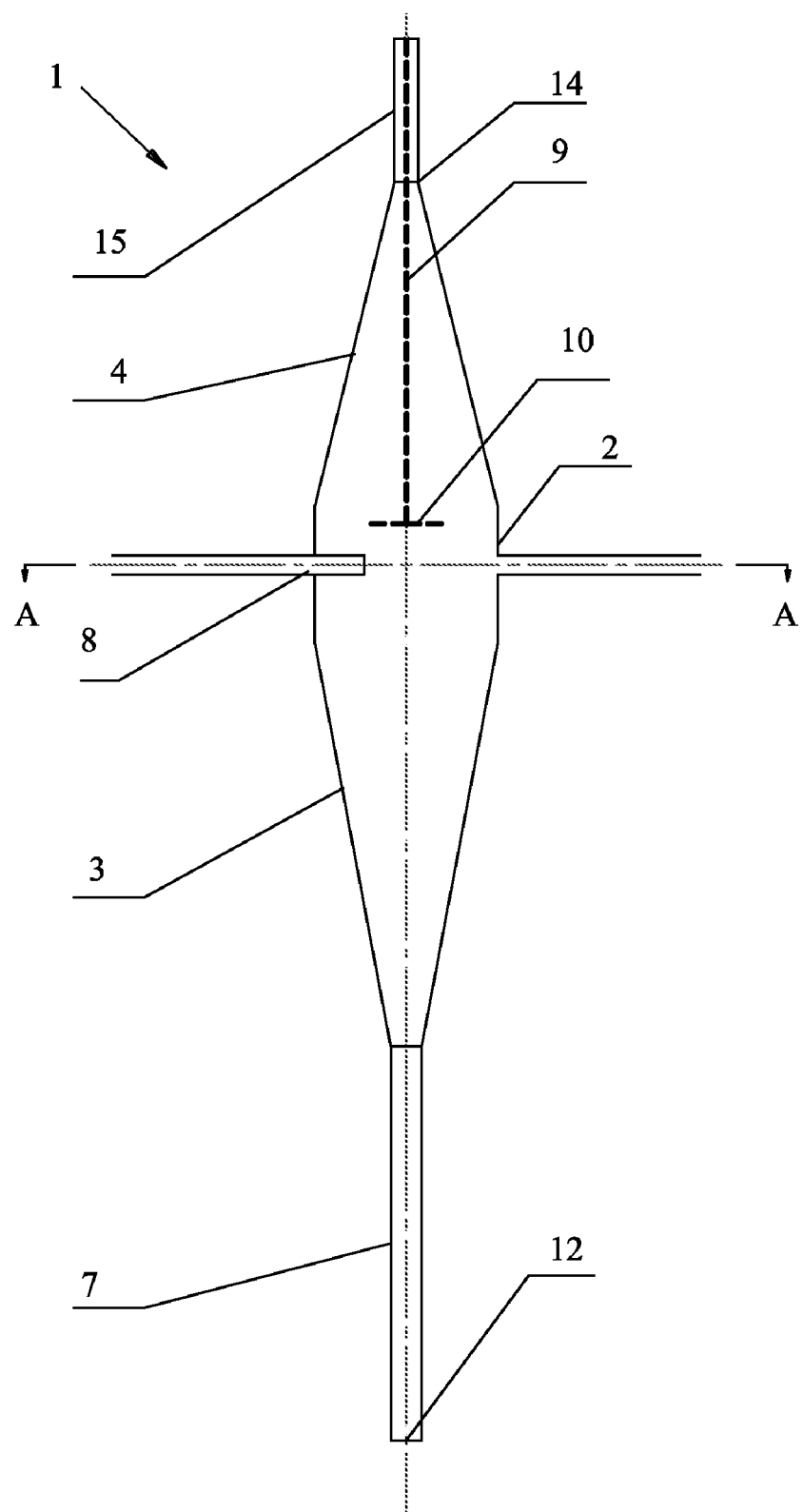
FIG. 1 is a schematic view of an embodiment of a cyclone separator according to the present invention.
Figure 2:
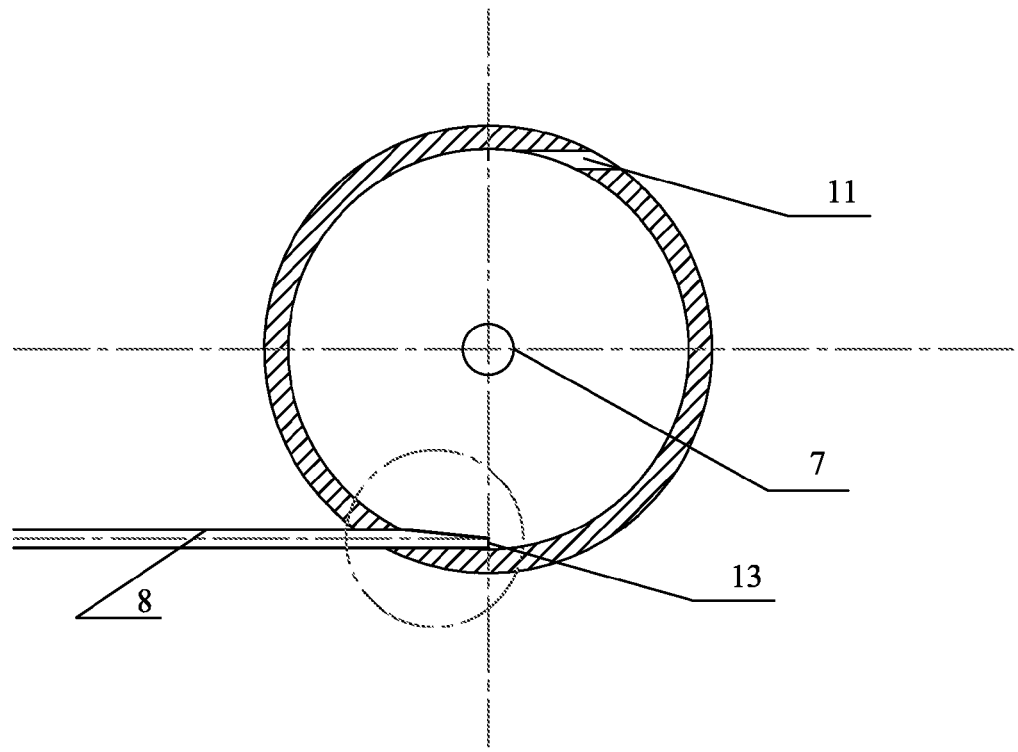
FIG. 2 is a cross-sectional view in large scale, taken along line A-A of FIG. 1.
Figure 3:
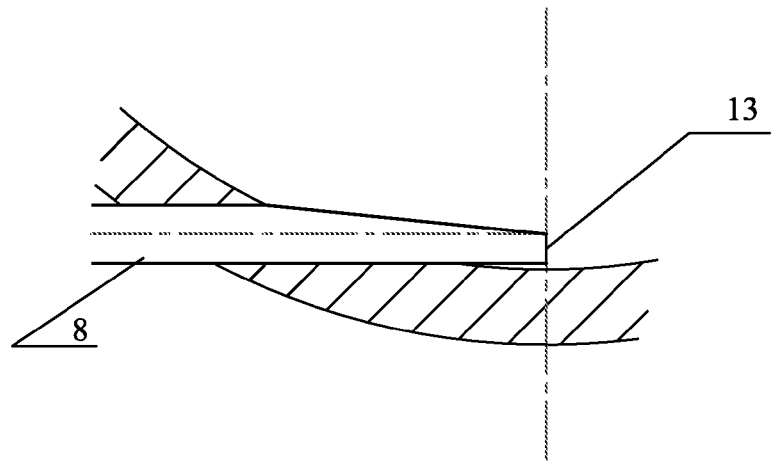
FIG. 3 is a detailed view of configuration shown in FIG. 2.

FIG. 1 illustrates an embodiment of a cyclone separator according to the present invention. Same reference numbers in the present specification and drawings are intended to represent the same or analogous features or elements in different embodiments. Referring now to FIG. 1, a cyclone separator 1 comprises an inlet section 2, a first cone 3 and a steady flow section 7 connected in succession. As shown, the first cone 3 is tapered downwards, and the steady flow section 7 is in the form of an elongated cylindrical pipe with outlet 12 provided at its tail. The inlet section 2 is configured as a straight cylinder pipe with at least one tangent inlet 11. Referring to FIGS. 2 and 3, in this embodiment, there are two tangent inlets 11 located at the same height and spaced apart 180 degree. However, it would be easy for one skilled in the art to envisage more or less tangent inlets, and these tangent inlets may be located at difference heights. Inflow pipes 8 are inserted into each of tangent inlets 11 respectively and are preferably aligned with the inner wall of the inlet section 2. In FIG. 2, in order to show the tangent inlet 11, one inflow pipe is omitted. Preferably, at the inlet section 2, the inlets are configured to let the fluid rotate counter-clockwise.

The inner diameter of the inflow pipe 8 is reduced at the pipe opening 13 to increase the flow speed of fluid. In general, the smaller the inlet diameter is, the higher the flow speed at the inlet is, and the greater the centrifugal force is, which in some extent facilitates separating two phase with different granularity or density, such as oil phase and water phase. As the mediums in the cyclone separator 1 such as oil phase and water phase mediums are separated via a centrifugal force generated by high speed rotation, the high speed rotation inevitably produces effect of shear stress which will break the separated and dispersed phase, such as oil drops, into much smaller liquid drops, which increases the difficulty of separation. In view of this, the flow speed at the inlet of the cyclone separator is not the higher the better and should be controlled within a proper range. In this embodiment, the inner diameter of the inflow pipe 8 is reduced by half at the pipe opening 13. In principle, during the separation of liquid phase-liquid phase e.g. oil phase and water phase, the cyclone separator is preferably operated under normal pressure without the pump so as to save energy. The size of the inflow pipe 8 may be adjusted depending on the mediums to be separated.

Referring to FIG. 1 again, the cyclone separator further comprises a second cone or tapered body 4 (hereinafter referred to as the second cone 4 or cone 4) positioned above and connected with the inlet section 2. The second cone or tapered body 4 is preferably in the shape of round and tapered upwards, and forms an oil collecting section. Herein, the cone 4 may be comprised of different cone sections or tapered body sections and has a top opening 14. The top opening 14 is connected with a discharging pipe 15. A valve is provided downstream the top opening 14 for switching the top opening. The valve can be switched on at regular interval when the cyclone separator is operating.

Figure 4:
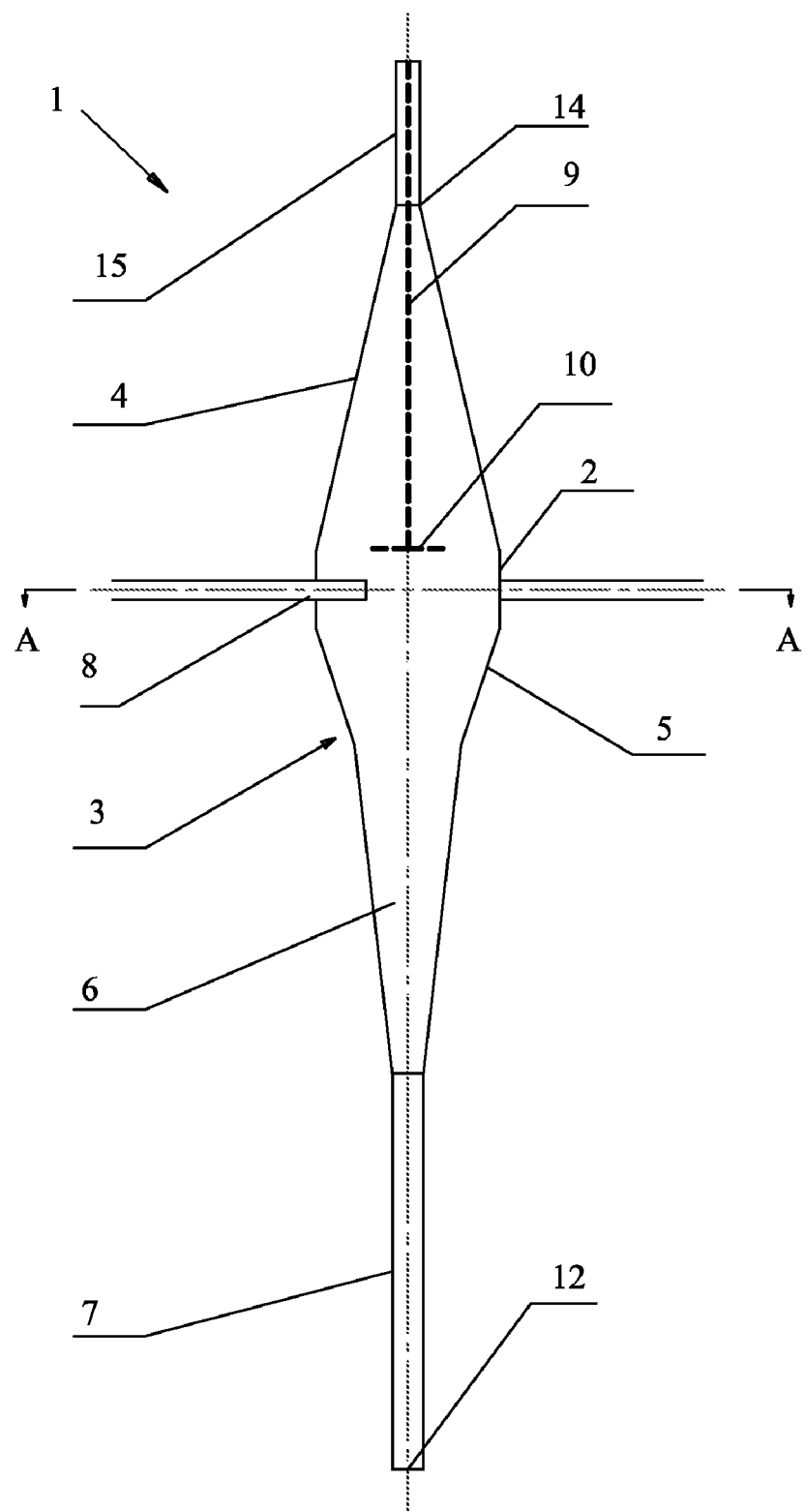
FIG. 4 is a schematic view of another embodiment of a cyclone separator according to the present invention.

As shown in FIG. 4, in another embodiment according to the present invention, the first cone 3 is preferably designed to have an accelerating section 5 and a separating section 6 connected in sequence, wherein the taper angle (e.g. 10 degree~30 degree) of the accelerating section 5 is much larger than that of the separating section 6, but the length of the accelerating section is shorter than that of the latter. The swirling flow speed of the mediums moving downwards is increased as the taper angle of the separating section 6 is reduced relative to that of the accelerating section 5. This configuration is much advantageous for separation of two phases with different density, such as oil phase and water phase. If necessary, the accelerating section 5 may be comprised of a plurality of sections with different taper angles.

When the above cyclone separator is used for separating oil and water, in case the oil content of wastewater is higher or the viscosity of the oil to be separated is greater, an assistant blade or blades 10 is/are provided at slightly above the middle of the inlet section 2. The assistant blade is coaxial with the second cone or tapered body 4. In this embodiment, for example, the assistant blade 10 is in the form of a small impeller and is installed on a shaft 9, which is driven by means of the worm-gear drive device (not shown) via the motor. The assistant blade has a rotating speed in the range of 20~3000 RPM. To this end, a motor with adjustable rotating speeds or a transmission with adjustable output speed can be adopted.

In order to prevent the fluid from being disturbed excessively, it is not so good to have large radius of assistant blade 10, and the rotating speed of the assistant blade may be adjusted depending on the properties of the medium to be separated, e.g. the assistant blade may have a lower rotating speed when used for wastewater having oil with higher viscosity, while it may have a higher rotating speed when used for two phase medium having a lower viscosity. In this respect, the assistant blade 10 is mainly used for separating wastewater containing oil with higher viscosity and wastewater of higher oil content. Under a certain rotating speed, the oil of higher viscosity presents a shear thinning property of non-Newtonian fluid, and thus the viscosity of the oil is reduced by mixing and accelerating of the assistant blade, therefore the flow characteristic of the oil is improved, which results in easily and quickly moving up for the separated oil along the conical surface. Referring to FIGS. 1 and 4, during the separating two phases, mixed fluid such as oil-water mixture enters in the direction of tangent from the inflow pipe 8 into the cone, in which the tangential motion of the fluid is converted to the rotating motion by the action of side wall, resulting in vortex flow, as the fluid has a certain pressure and enters into the cyclone separator in the direction of tangent. When the mixed fluid flows from the inlet section to the first cone 3 (or accelerating section 5), the vortex flow effect is intensified under action of the conical surface.

In the first cone 3 (or the separating section 6), the fluid has a high centrifugal acceleration due to high speed rotation, and the phase with lower density (oil phase) is transferred to the central axis under the action of centrifugal force. The light phase (oil phase) flowed in opposite direction (upward) is easily captured by means of the second cone or tapered body with large diameter, then is tapered along the inner surface, and to reach a maximum flow speed at the top opening. In this way, the light phase can be drawn out with little heavy phase medium. At the same time, the phase with higher density (water phase) moves towards the side wall, flows through the steady flow section 7, and then is discharged from the cyclone separator 1 at its bottom. In some cases, a valve is provided downstream the top opening 14 for switching the top opening, and the valve can be switched on at regular interval, so as to draw out the light phase medium more effectively.

Figure 5:
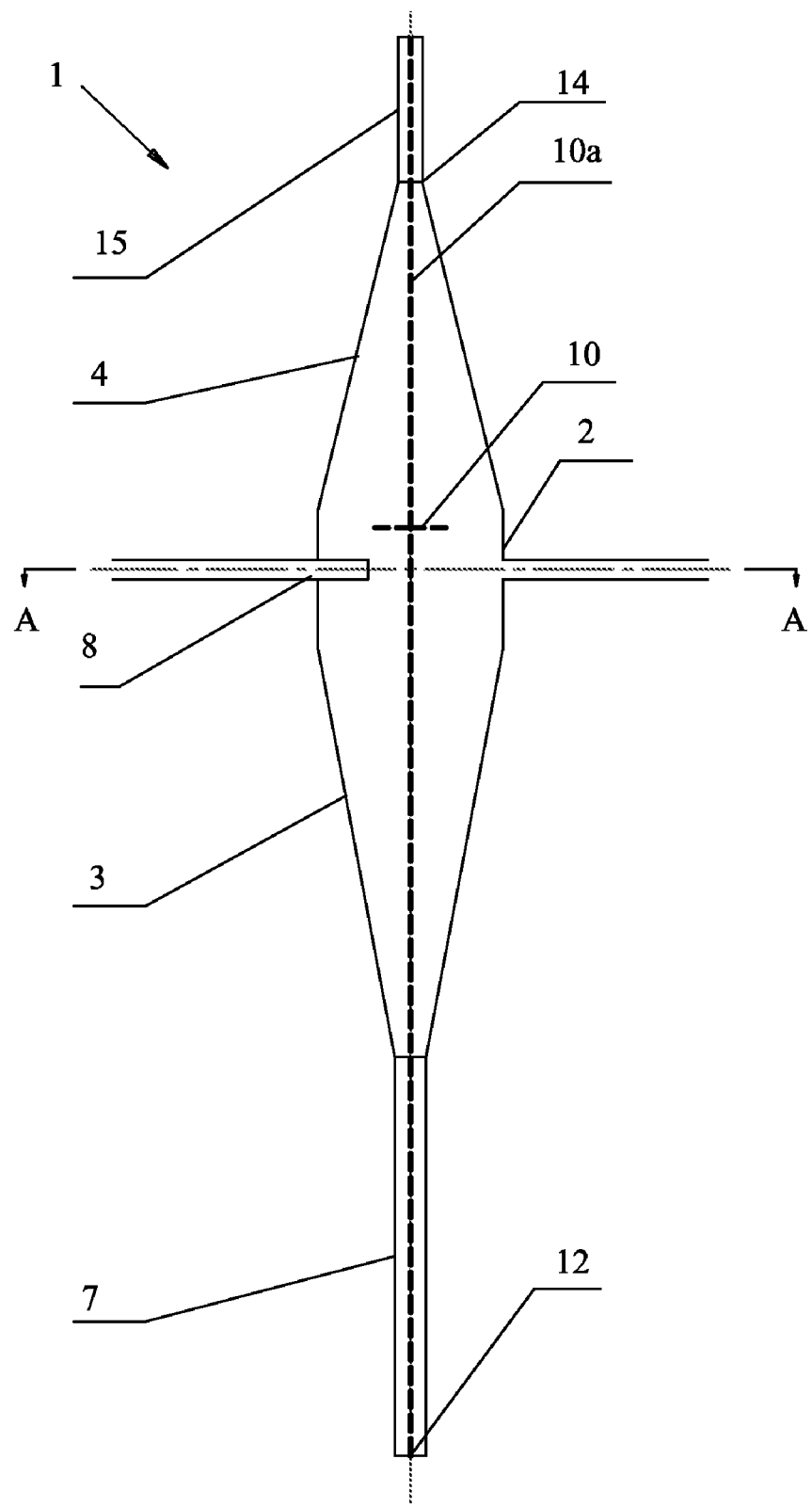
FIG. 5 is a schematic view of yet another embodiment of a cyclone separator according to the present invention.

In a further embodiment of the present invention, the structure is more suitable for liquid-liquid separation and liquid-gas separation. As shown in FIG. 5, an elongated cylinder 10a is installed along the centre axis of the cyclone separator 1, and the cylinder 10a typically extends from the top opening 14 through the steady flow section 7. Furthermore, the cylinder 10 may be driven by a motor with a rotating speed in the range of 20~3000 RPM. Herein, the cylinder is hollow at least from the vicinity of the middle of the inlet section 2 to the top opening 14 and is closed adjacent the middle of the inlet section 2 and opened at the top. A hole or holes communicated with the top is/are provided on a hollowed side wall of the cylinder adjacent the closed position. Certainly, the cylinder or shaft 10a only extending from the top opening 14 into the middle of the inlet section 2 (i.e. vicinity of tangent inlets 11) also falls within the scope of the present invention.

According to the above mentioned embodiment, in the first cone 3, the fluid has a high centrifugal acceleration due to high phase speed rotation, and the light phase medium (oil phase) is transferred to the central axis under the action of centrifugal force. A great deal of separated light phase medium is collected above the vicinity of the inlet 11, and some of them enter into the hollow part of the cylinder 10a through said hole or holes and move upward along the inner wall, so as to remove the light phase medium collected in the vicinity of the hole or holes quickly and prevent the phase with lower density from re-mixing with the mediums that are entering from the inflow pipe and to be separated.

In order to enhance the flow guiding action, one or more spiral channel(s) is/are provided on the outer wall of cylinder 10a adjacent to steady flow section 7, such that the channel(s) can generate a downward pressure when the cylinder is rotating in the direction of swirling flow, so as to further thicken the heavy phase medium.

In addition, as required, the cylinder 10a is provided with an assistant blade 10 which is located slightly above the middle of the inlet section 2. It is comprehended that the cylinder 10a may not rotate in case there is no assistant blade and spiral channel(s). In this case, the structure will be much simple.

In another aspect, the cylinder 10a may also extends to a position above the inlet of the steady flow section 7, and one or more spiral channel(s) is/are provided on the inner wall of the steady flow section 7 adjacent to this position. Meanwhile, other portion of the cylinder may also be hollow, but is not fluid communicated with the upper section of cylinder.

Figure 6:
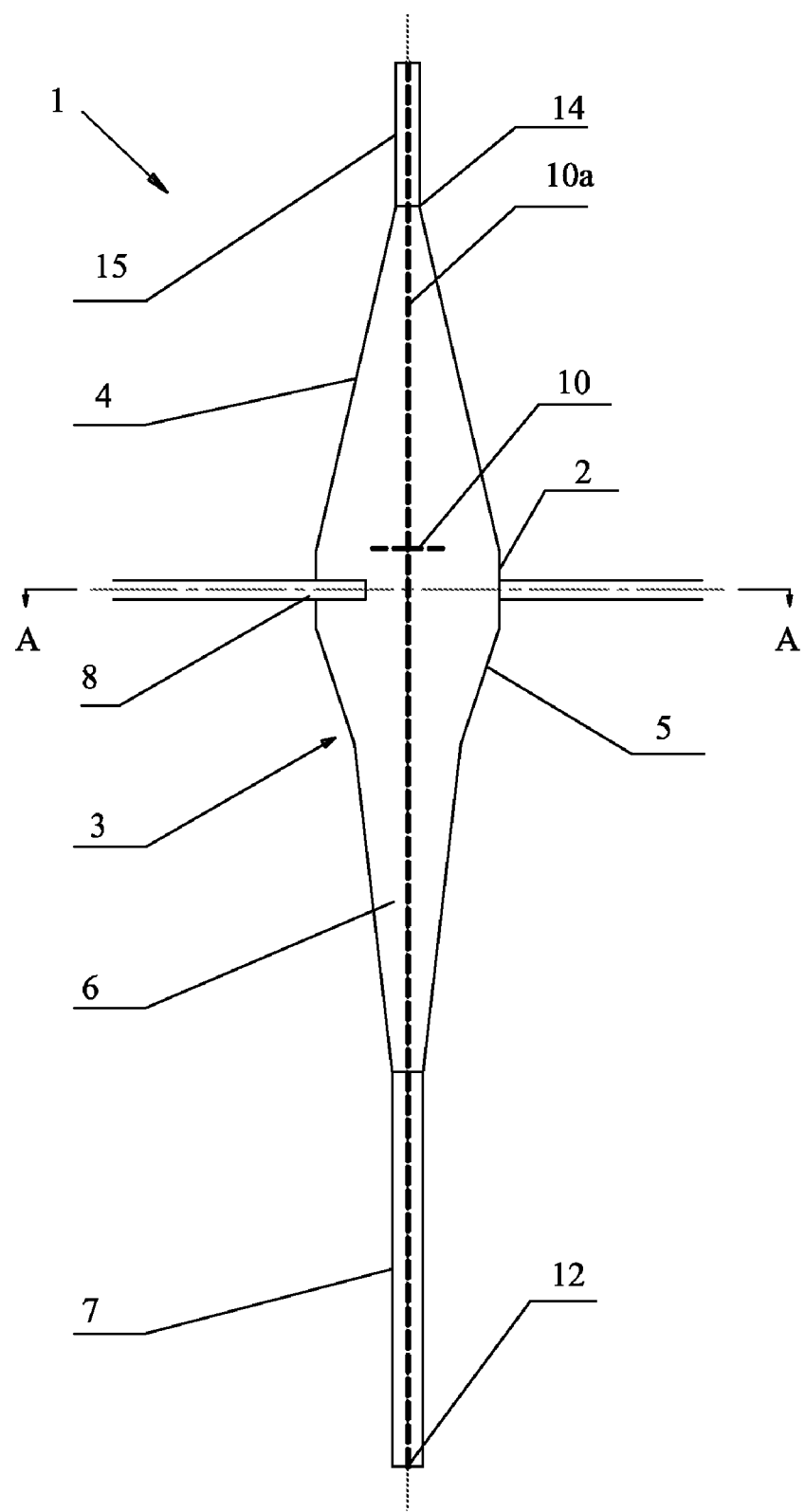
FIG. 6 is a schematic view of further embodiment of a cyclone separator according to the present invention.

Similarly, in these embodiments, the first cone 3 of the cyclone separator is also preferably configured to have an accelerating section 5 and a separating section 6 connected in sequence, as shown in FIG. 6.

The cyclone separator according to the present invention is generally of a double-cones structure, such that the fluid is separated into an upward light phase and downward heavy phase under the action of the centrifugal force and the double-cones structure. In addition, the rotational shaft provided in the interior of cyclone separator would intensify the rotation motion and separation effects. Moreover, the cyclone separator is upright, which enables the light phase and the heavy phase much easier to be separated under the action of gravity when the mixture therein is rotating. Further, this kind of cyclone separator not only can be applied to sewage treatment in petroleum, chemical, iron and steel, paper making, power, light industry and environmental protection, but also can be used to separate two-phase medium with different densities, such as solid-liquid separation, liquid-liquid separation, and gas-solid separation, etc.

These and other modifications and variations to the present disclosure may be practiced by those of ordinary skill in the art, without departing from the spirit and scope of the present disclosure, which is more particularly set forth in the appended claims. In addition, it should be understood that aspects of the various aspects of the present disclosure may be interchanged either in whole or in part. Furthermore, those of ordinary skill in the art will appreciate that the foregoing description is by way of example only, and is not intended to limit the disclosure so further described in such appended claims.

The invention claimed is:

1. A cyclone separator (1), comprising:
   an inlet section (2), a first cone (3) and a steady flow section (7) that are connected in succession, wherein the inlet section (2) is provided with at least one tangent inlet (11) with which an inflow pipe (8) is connected;
   the first cone (3) is tapered downwards;
   the steady flow section (7) is an elongated cylindrical pipe with an outlet (12) at its tail;
   a shaft is installed along a centre axis of the cyclone separator, and said shaft extends at least from the top opening (14) to a vicinity of a middle of the inlet section (2); and
   a second cone or tapered body (4) positioned above the inlet section (2) and connected to the inlet section (2), wherein said second cone or tapered body (4) is tapered upwards and has a top opening (14).

2. The cyclone separator according to claim 1, wherein the shaft is a rotational shaft (9) with a rotating speed in the range of 20~3000 RPM.

3. The cyclone separator according to claim 2, wherein the rotational shaft is provided with a spiral channel on its outer wall adjacent to the steady flow section (7).

4. The cyclone separator according to claim 3, wherein the rotational shaft (9) is provided with an assistant blade (10) which is located slightly above the middle of the inlet section (2).

5. The cyclone separator according to claim 2, wherein the rotational shaft (9) is provided with an assistant blade (10) which is located slightly above the middle of the inlet section (2).

6. The cyclone separator according to claim 2, wherein:
   the shaft is in the form of a cylinder (10a) which is hollow at least from the vicinity of the middle of the inlet section (2) to the top opening (14) and is closed adjacent the middle of the inlet section (2) and opened at the top; and
   the side wall of the hollow cylinder adjacent the closed position is provided with a hole in communication with the top opening.

7. The cyclone separator according to claim 1, wherein:
   the shaft is in the form of a cylinder (10a) which is hollow at least from the vicinity of the middle of the inlet section (2) to the top opening (14) and is closed adjacent the middle of the inlet section (2) and opened at the top; and
   the side wall of the hollow cylinder adjacent the closed position is provided with a hole in communication with the top opening.

8. The cyclone separator according to claim 1, wherein the first cone (3) includes an accelerating section (5) and a separating section (6), wherein the accelerating section (5) and the separating section (6) each has a different angle of taper.

9. The cyclone separator according to claim 1, wherein said at least one tangent inlet (11) includes two tangent inlets (11) through which a fluid enters and then rotates counter-clockwise in the inlet section (2).

10. The cyclone separator according to claim 9, wherein the two tangent inlets (11) are located at the same height and spaced apart 180 degrees.

11. The cyclone separator according to claim 1, further comprising a valve positioned downstream of the top opening (14) so as to open or close the top opening (14).

12. A cyclone separator (1), comprising:
   an inlet section (2), a first cone (3) and a steady flow section (7) that are connected in succession, wherein the inlet section (2) is provided with at least one tangent inlet (11) with which an inflow pipe (8) is connected;
   the first cone (3) is tapered downwards;
   the steady flow section (7) is an elongated cylindrical pipe with an outlet (12) at its tail;
   a second cone or tapered body (4) positioned above the inlet section (2) and connected to the inlet section (2), wherein said second cone or tapered body (4) is tapered upwards and has a top opening (14); and
   a rotational shaft (9) installed along a centre axis of the cyclone separator, wherein said rotational shaft (9) extends at least from the top opening (14) to a vicinity of a middle of the inlet section (2) and is provided with an assistant blade (10) which is located slightly above the middle of the inlet section (2).

13. The cyclone separator according to claim 12, wherein the rotational shaft has a rotating speed in the range of 20~3000 RPM.

14. The cyclone separator according to claim 12, wherein:
   the rotational shaft (9) is in the form of a cylinder (10a) which is hollow at least from the vicinity of the middle of the inlet section (2) to the top opening (14) and is closed adjacent the middle of the inlet section (2) and opened at the top; and
   the side wall of the hollow cylinder adjacent the closed position is provided with a hole communication with the top opening.

15. The cyclone separator according to claim 12, wherein the rotational shaft is provided with a spiral channel on its outer wall adjacent to the steady flow section (7).

16. The cyclone separator according to claim 12, wherein the first cone (3) includes an accelerating section (5) and a separating section (6), wherein the accelerating section (5) and the separating section (6) each has a different angle of taper.

17. The cyclone separator according to claim 12, wherein said at least one tangent inlet (11) includes two tangent inlets (11) through which a fluid enters and then rotates counter-clockwise in the inlet section (2).

18. The cyclone separator according to claim 17, wherein the two tangent inlets (11) are located at the same height and spaced apart 180 degrees.

19. The cyclone separator according to claim 12, further comprising a valve positioned downstream of the top opening (14) so as to open or close the top opening (14).

* * * * *